United States Patent [19]

Longhetto

[11] 4,052,899

[45] Oct. 11, 1977

[54] DEPTHOMETER FOR UNDERWATER IMMERSION

[75] Inventor: Francesco Longhetto, Turin, Italy

[73] Assignee: Semperit Anstalt, Schaan, Liechtenstein

[21] Appl. No.: 672,238

[22] Filed: Mar. 31, 1976

[30] Foreign Application Priority Data

Apr. 4, 1975 Italy ................................ 67865/75

[51] Int. Cl.$^2$ ........................ G01F 23/14; G01L 7/08
[52] U.S. Cl. ................................. 73/300; 73/406; 73/431
[58] Field of Search ............... 73/300, 431, 406; 116/129 A, 129 B

[56] References Cited

U.S. PATENT DOCUMENTS

| 3,203,244 | 8/1965 | Alinari | 73/300 |
| 3,651,693 | 3/1972 | Alinari | 73/300 |
| 3,712,138 | 1/1973 | Alinari | 73/431 |
| 3,869,916 | 3/1975 | Ojima | 73/431 |

*Primary Examiner*—Donald O. Woodiel
*Attorney, Agent, or Firm*—H. Dale Palmatier

[57] ABSTRACT

A depthometer having an outer waterproof casing provided with a transparent wall through which a graduated dial is visible, an indicator element movable along said dial, and an actuating element for said indicator, this actuating element being responsive to external pressure and consisting in an elastically deformable end wall of a cup-shaped member forming part of said outer casing, and a lateral wall of said cup-shaped member being stiffened to be indeformable with said end wall.

15 Claims, 2 Drawing Figures

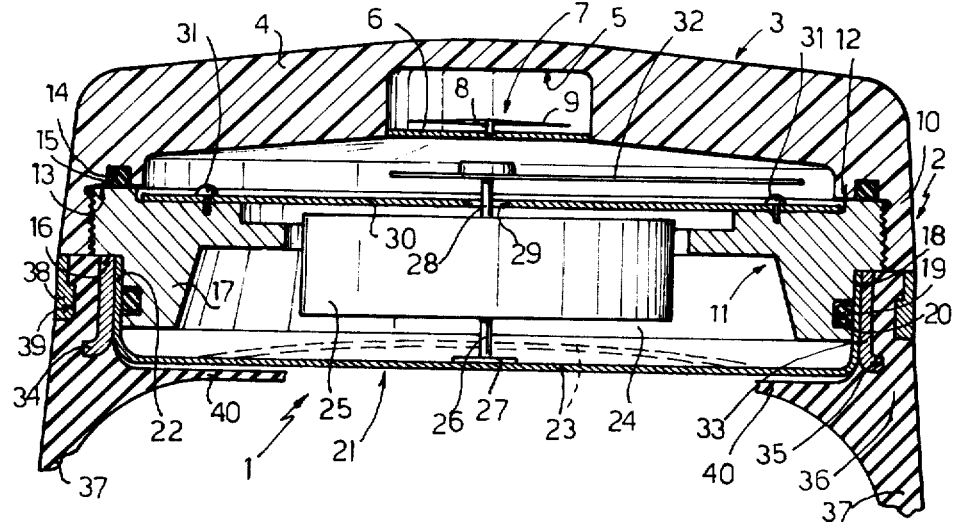
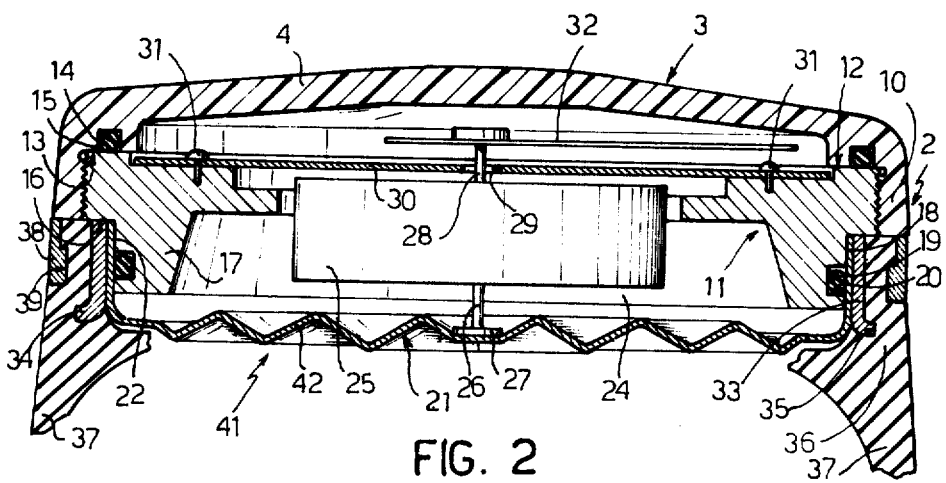

DEPTHOMETER FOR UNDERWATER IMMERSION

BACKGROUND OF THE INVENTION

This invention relates to a depthometer for underwater immersion.

In particular, the present invention relates to a depthometer of the type comprising an outer waterproof casing, at least a portion of which consists of transparent material; a graduated dial visible from the outside through the transparent portion of the casing; an element deformable in accordance with the external pressure; and a mechanical transducer, the inlet of which is connected to the deformable element and the outlet of which is connected to an indicator element to move the latter along the dial in accordance with the deformation of the deformable element.

In known depthometers of the aforementioned type, the deformable element generally consists of a diaphragm disposed in said outer casing, and to which the external pressure is transmitted by a deformable portion of the outer casing, either directly or by way of transmission means. In one particular known depthometer of the aforementioned type, the diaphragm consists of an elastically deformable metal disc which simply rests on the end of a rigid annular member which supports the dial and transducer means, and is kept in contact with the annular member by the outer casing. This latter consists of a cup member of rubber or other synthetic material closed at the front by a transparent wall, its end wall being particularly thin and elastic, and disposed in contact with the metal disc so that its own deformation due to the external pressure is transmitted thereto.

The aforementioned known depthometer, although practical and functional, may give rise to various disadvantages with use, the most serious of which are the ageing of the outer casing, which can lead to considerable variations in the manner in which the external pressure is transmitted to the metal disc, and the fact that the outer casing, consisting of synthetic material, may be easily cut by contact with rocks or other cutting formations during immersion, so leading to water entry into the depthometer, and generally its irreparable damage.

SUMMARY OF THE INVENTION

The object of the present invention is to provide a depthometer free from the aforementioned disadvantages, and which has a relatively simple, robust and compact structure.

According to the present invention there is provided a depthometer of the type heretofore described, wherein said deformable element consists of an elastic end wall of a metal cup member comprising a lateral wall extending from the periphery of the end wall and integral with it; the cup member forming part of the outer casing; and stiffening means cooperating with said lateral wall to make this latter indeformable with the end wall.

BRIEF DESCRIPTION OF THE DRAWINGS

The invention will be described by way of example with reference to the accompanying drawings, wherein:

FIG. 1 is an axial section through a first embodiment of the depthometer according to the invention; and FIG. 2 is an axial section through a second embodiment of the depthometer according to the invention.

DETAILED DESCRIPTION OF THE INVENTION

FIG. 1 shows a depthometer, indicated overall by 1, comprising an outer substantially cylindrical waterproof casing 2. The casing 2 comprises a front transparent cup member 3, consisting preferably of relatively rigid synthetic material and comprising a substantially circular end wall 4, which in the illustrated embodiment is slightly convex outwards and comprises a central internal cylindrical cavity 5. The cavity 5 is closed by a graduated plate 6 forming the dial of a compass 7 which rotatably supports a magnetised needle 9 by a pivot 8. In one unillustrated modification, the cavity 5 houses, either in addition to or instead of the compass 7, a thermometer for measuring the external temperature. In a further unillustrated modification, the end wall 4 is thinner than that shown in FIG. 1 and is without the cavity 5.

The periphery of the end wall 4 is integral with the front end of a cylindrical wall 10, the inner surface of which is threaded and engages an outer thread of a rigid annular member 11. This latter has an annular flat front surface 12, disposed in contact with a flat annular surface 13 on the periphery of the inner surface of the end wall 4. The surface 13 has an annular groove 14, in which is housed a seal ring 15 compressed between the bottom of the groove 14 and the surface 12.

The annular member 11 is limited rearwards by a second flat annular surface 16 parallel to the surface 12, and from which an annular appendix 17 extends. This latter is limited externally by a cylindrical surface 18 provided with an annular groove 19, which houses a seal gasket 20.

The appendix 17 is forcibly mounted in a metal cup member 21 with its cylindrical surface 18 disposed in contact with the inner surface of a lateral cylindrical wall 22 of the cup member 21, and with the gasket 20 compressed between the bottom of the groove 19 and the wall 22. The cup member 21 preferably consists of drawn sheet metal, with its concavity facing the concavity of the front cup member 3 to form the rear part of the outer casing 2. The cup member 21 comprises a substantially flat end wall 23 of substantially circular shape in plan. The wall 23 is integral at its periphery with the rear end of the lateral wall 22, and forms a flexible, axially deformable foil.

The cup members 3 and 21, connected together by way of the annular member 11, define an internal chamber 24 therebetween, in which is mounted a mechanical transducer 25 supported by the annular member 11. The transducer 25 comprises a mechanical inlet, consisting of an axially mobile rod 26 maintained in contact with a central disc 27 on the end wall 23 by elastic means, not shown, and a mechanical outlet consisting of a rotatable shaft 28, the angular movements of which are proportional in extent and sign, to the axial movements of the rod 26. Preferably the transducer 25 comprises means (not shown) for amplifying at their outlet the inlet signals consisting of the axial movements of the rod 26. The shaft 28 extends through a central hole 29 in a disc 30 connected by screws 31 to the flat front annular surface 12 of the annular member 11, and supports a radial pointer 23 at the front of the disc 30. This pointer is moved by the shaft 28 along a scale (not shown) graduated generally in meters or fractions of a meter drawn on the outer periphery of the front surface of the disc 30, which forms the dial of the depthometer 1.

A rigid ring 33 preferably made of metal is forcibly mounted on the outer surface of the lateral wall 22 of the cup member 21, and its thickness, which is greater than the thickness of the lateral wall 22, makes this later substantially insensitive to the radial forces transmitted to it by the wall 22 following the axial deformations of the end wall 23. The ring 33 is disposed with its front in contact with the annular surface 16, and comprises at its rear end an outer radial flange 34, engaged in an annular groove 35 in an annular member 36 consisting preferably of resilient synthetic material. The member 36 is disposed with its front in contact with the free of the lateral wall 10 of the cup member 3, and comprises at its rear two diametrically opposing axial flexible appendices 37, which form a strap for fixing the depthometer to a limb of an underwater swimmer. The annular member 36 is secured to the ring 33 by an outer rigid ring 38 mounted in a groove 39 formed in the outer surface of the annular member 36 between its front end and the groove 35. Preferably, as in the example illustrated, any possibility of accidental separation of the flange 34 from the groove 35 is eliminated by connecting together diametrically opposite points on the inner surface of the annular member 36 with strips 40 integral with the annular member 36, and extending parallel to the outer surface of the end wall 23 of the member 21.

In an unillustrated modification, a perforated metal disc is mounted in the annular member 36 parallel to the outer surface of the wall 23, to mechanically isolate this latter and prevent any forces being applied to it other than the outer hydrostatic pressure.

FIG. 2 shows a depthometer 41, substantially identical to the depthometer 1 except for the fact that the rear cup member 21 comprises an undulated end wall 42, and is therefore able to make relatively large axial deformations, greater than those of the depthometer 1 for equal external pressures 23.

As shown in FIG. 2, the end wall 4 of the cup member 3 of the depthometer 41 is thinner than that of the depthometer 1, and is without the cavity 5 or compass 7.

When the depthometer 1 is immersed to a certain depth, the pressure of the external water on the end wall 23 causes this latter to deform and the disc 27 to move towards the cup member 3. As the lateral wall 22 of the cup member 21 is forcibly embedded between the outer rigid ring 33 and annular rigid appendix 17 of the annular member 11, the outer periphery of the end wall 23 is substantially prevented from rotating about the rear end of the wall 22, or from moving radially inwards, as would occur if the wall 22 was left free to deform. Consequently, the wall 23 behaves as a circular plate constrained at its periphery and loaded with a normal uniformly distributed load. Under these conditions, the axial movements of the disc 27 are related to the load by a law greater than cubic. This fact is very advantageous, as the angular movements of the pointer 32 for a determined change in external pressure are considerable for relatively low pressures, whereas they are relatively small for relatively high pressures. Consequently, the depth readings are extremely precise and easily readable at low depths, i.e. precisely where the underwater swimmer needs to exactly know his own depth to correctly undergo the necessary decompression periods.

The aforesaid however is not valid in the case of the depthometer 41, in which the end wall 42, being undulated, behaves substantially as a spring with its deformation related to the load by a substantially linear law. Because of this characteristic, the end-of-scale reading of the depthometer 41 is generally lower than that of the depthometer 1, and it is limited to depths for which the importance of the non-linearity of the movements of the pointer 32 with the external pressure is negligible.

It is important to note that in both depthometers 1 and 41, the annular member 36 is merely a fixing support for the means for connecting the relative depthometer to a limb of the user, and the rear part of the outer casing 2 consists of the cup member 21 which, being of metal, gives strength to the depthometer.

What I claim is:

1. Depthometer for underwater immersion of the type comprising an outer waterproof casing, at least a portion of which consists of transparent material; a graduated dial visible from the outside through the transparent portion of the casing; an element deformable in accordance with the external pressure; and a mechanical transducer, the inlet of which is connected to the deformable element, and the outlet of which is connected to an indicator element to move the latter along the dial in accordance with the deformation of the deformable element; the depthometer being characterized in that said deformable element consists of an elastic end wall of a metal cup member including a peripheral lateral wall extending from the periphery of the end wall and integral with it, supporting means rigid with the lateral wall and supporting the mechanical transducer, the cup member forming part of and sealed to the outer casing; and stiffening means cooperating with said lateral wall to make this latter indeformable with the end wall.

2. Depthometer as claimed in claim 1, wherein said cup member consists of drawn sheet metal.

3. Depthometer as claimed in claim 1, wherein said cup member forms a rear part of the outer casing, the front part of this latter being formed by said transparent portion.

4. Depthometer as claimed in claim 1, wherein said stiffening means comprise a forcibly mounted rigid ring in contact with the outer surface of the lateral wall of the cup member.

5. Depthometer as claimed in claim 4, wherein said supporting means also includes a rigid annular member, at least part of which is forcibly inserted in a sealed manner into the cup member; said annular member supporting the dial in a fixed position and cooperating under sealed conditions with said transparent wall of the casing to connect this latter to the cup member.

6. Depthometer as claimed in claim 5, wherein said rigid ring is provided with an external radial flange engaged in an annular internal groove in an annular member of resilient material, this latter comprising fixing means connected thereto, to connect the depthometer to a support.

7. Depthometer for underwater immersion of the type comprising an outer waterproof casing, at least a portion of which consists of transparent material; a graduated dial visible from the outside through the transparent portion of the casing; an element deformable in accordance with the external pressure; and a mechanical transducer, the inlet of which is connected to an indicator element to move the latter along the dial in accordance with the deformation of the deformable element; the depthometer being characterized in that said deformable element consists of an elastic end wall of a metal cup member comprising a lateral wall extending from the periphery of the end wall and integral with it, the cup member forming part of the outer casing; stiffening means cooperating with said lateral wall to make this latter indeformable with the end wall, said cup member being formed of drawn sheet metal, and said end wall is constrained and configured in such a manner as to deform axially as a function of the external pressure in accordance with a law greater than cubic.

8. Depthometer as claimed in claim 7, wherein said end wall is substantially in the form of a flat disc, the periphery of which is integral with one end of the lateral wall.

9. Depthometer for underwater immersion of the type comprising an outer waterproof casing, at least a portion of which consists of transparent material; a graduated dial visible from the outside through the transparent portion of the casing; an element deformable in accordance with the external pressure; and a mechanical transducer, the inlet of which is connected to the deformable element, and the outlet of which is connected to an indicator element to move the latter along the dial in accordance with the deformation of the deformable element; the depthometer being characterized in that said deformable element consists of an elastic end wall of a metal cup member comprising a lateral wall extending from the periphery of the end wall and integral with it, the cup member forming part of the outer casing; stiffening means cooperating with said lateral wall to make this latter indeformable with the end wall, said cup member being formed of drawn sheet metal, and said end wall is configured in such a manner as to deform axially as a function of the external pressure in accordance with a substantially linear law.

10. Depthometer as claimed in claim 9, wherein said end wall is substantially in the form of an undulated disc, the periphery of which is integral with one end of the lateral wall.

11. Depthometer for underwater immersion of the type comprising an outer waterproof casing, at least a portion of which consists of transparent material; a graduated dial visible from the outside through the transparent portion of the casing; an element deformable in accordance with the external pressure; and a mechanical transducer, the inlet of which is connected to the deformable element, and the outlet of which is connected to an indicator element to move the latter along the dial in accordance with the deformation of the deformable element; the depthometer being characterized in that said deformable element consists of an elastic end wall of a metal cup member comprising a lateral wall extending from the periphery of the end wall and integral with it, the cup member forming part of the outer casing; stiffening means cooperating with said lateral wall to make this latter indeformable with the end wall, said stiffening means including a forcibly mounted rigid ring in contact with the outer surface of the lateral wall of the cup member, said stiffening means also including a rigid annular member, at least part of which is forcibly inserted in a sealed manner into the cup member; said annular member supporting the dial in a fixed position and cooperating under sealed conditions with said transparent wall of the casing to connect this latter to the cup member, said rigid ring being provided with an external radial flange engaged in an annular internal groove in an annular member of resilient material, this latter comprising fixing means connected thereto, to connect the depthometer to a support, and a rigid stop ring is mounted in contact with the outer surface of said annular member of resilient material, in an axial position between said flange and the free end of the lateral wall of the cup member.

12. Depthometer as claimed in claim 11, wherein a perforated rigid disc is supported in said annular member of resilient material externally to the outer surface of the end wall of the cup member.

13. Depthometer for underwater immersion of the type comprising an outer waterproof casing, at least a portion of which consists of transparent material; a graduated dial visible from the outside through the transparent portion of the casing; an element deformable in accordance with the external pressure; and a mechanical transducer, the inlet of which is connected to the deformable element, and the outlet of which is connected to an indicator element to move the latter along the dial in accordance with the deformation of the deformable element; the depthometer being characterized in that said deformable element consists of an elastic end wall of a metal cup member comprising a lateral wall extending from the periphery of the end wall and integral with it, the cup member forming part of the outer casing; stiffening means cooperating with said lateral wall to make this latter indeformable with the end wall, and said transparent wall of the casing comprises an internal cavity, in which is housed a compass.

14. Depthometer for underwater immersion of the type comprising an outer waterproof casing, at least a portion of which consists of transparent material a graduated dial visible from the outside through the transparent portion of the casing; an element deformable in accordance with the external pressure; and a mechanical transducer, the inlet of which is connected to the deformable element, and the outlet of which is connected to an indicator element to move the latter along the dial in accordance with the deformation of the deformable element; the depthometer being characterized in that said deformable element consists of an elastic end wall of a metal cup member comprising a lateral wall extending from the periphery of the end wall and integral with it, the cup member forming part of the outer casing; stiffening means cooperating with said lateral wall to make this latter indeformable with the end wall, and said transparent wall of the casing comprises an internal cavity, in which is housed a thermometer.

15. A depthometer for underwater immersion comprising an outer waterproof casing, at least one portion of which consists of transparent material, and at least another portion of which is deformable in accordance with the external pressure; a graduated dial arranged within said casing and visible through said transparent portion; and a mechanical transducer, an inlet of which is connected to said deformble portion and an outlet of which is connected to an indicator element movable along said dial in accordance with the deformation of said deformable portion; said outer casing comprising an intermediate rigid annular member supporting said dial and said transducer, a first cup-shaped member comprising said transparent portion, said first cup-shaped member being fitted onto one end portion of said rigid annular member and engaging positively the latter in water-tight relation, a second cup-shaped member arranged opposite to said first cup-shaped member with respect to said rigid annular member, said second cup-shaped member being made of drawn sheet metal and comprising an end wall forming said deformable portion, and a lateral axially extending peripheral wall integral with said end wall and force-fitted onto a peripheral portion of said rigid annular member; said lateral wall cooperating in water-tight relation with an outer surface of said peripheral portion of the rigid annular member, and outer rigid stiffening means being provided to make said lateral wall indeformable with said end wall, and to clamp said lateral wall against said peripheral surface.

* * * * *